United States Patent [19]

Inoue et al.

[11] Patent Number: 5,166,892
[45] Date of Patent: Nov. 24, 1992

[54] DEVICE FOR COMPENSATING FOR TIME-DEPENDENT ERROR DUE TO CREEP AND LIKE OF MEASURING APPARATUS

[75] Inventors: Shin-ichi Inoue; Akio Hirose, both of Kobe, Japan

[73] Assignee: Yamato Scale Company, Limited, Akashi, Japan

[21] Appl. No.: 842,746

[22] Filed: Feb. 27, 1992

Related U.S. Application Data

[63] Continuation of Ser. No. 517,948, May 2, 1990, abandoned.

[51] Int. Cl.[5] ............ G01L 19/04; G01G 23/01; G01G 23/48
[52] U.S. Cl. ............ 364/571.02; 364/571.03; 364/553; 364/567; 73/765; 73/766; 324/130
[58] Field of Search ............ 364/571.02, 571.01, 364/571.03, 571.06, 571.07, 506, 508, 550, 553, 551.01, 558, 567; 73/1 B, 4 R, 4 D, 765, 766, 769; 177/25.11; 324/130

[56] References Cited

U.S. PATENT DOCUMENTS

| | | | |
|---|---|---|---|
| 4,377,851 | 3/1983 | McNamara | 364/558 X |
| 4,412,298 | 10/1983 | Feinland et al. | 364/567 |
| 4,581,714 | 4/1986 | Reid | 364/571.07 |
| 4,691,290 | 9/1987 | Griffen | 364/567 |
| 4,692,299 | 9/1987 | Crew et al. | 364/553 X |
| 4,707,780 | 11/1987 | Gose et al. | 364/553 X |
| 4,796,212 | 1/1989 | Kitagawa | 364/567 X |
| 4,811,261 | 3/1989 | Kobayashi et al. | 364/553 X |
| 4,914,611 | 4/1990 | Yamanaka et al. | 364/567 |

FOREIGN PATENT DOCUMENTS

| | | |
|---|---|---|
| 50-33428 | 10/1975 | Japan . |
| 59-27849 | 7/1984 | Japan . |
| 59-131131 | 7/1984 | Japan . |
| 60-32127 | 7/1985 | Japan . |

Primary Examiner—Parshotam S. Lall
Assistant Examiner—Edward Pipala
Attorney, Agent, or Firm—Senniger, Powers, Leavitt & Roedel

[57] ABSTRACT

A device used in an apparatus, such as weigher, pressure gauge or the like, for essentially measuring a force, which utilizes a flexural member of elastic material for detecting the force by converting its deflection or strain caused by application of the force into an electric signal, and adapted to compensate for measurement error caused by a time-dependent change in the detection output as a result of creep and/or stress relaxation of the flexural member by removing error components by an electric circuit constructed in accordance with a principle of digital filter.

17 Claims, 5 Drawing Sheets

DEVICE FOR COMPENSATING FOR TIME-DEPENDENT ERROR DUE TO CREEP AND LIKE OF MEASURING APPARATUS

This is a continuation of co-pending application Ser. No. 07/517,948, filed on May 2, 1990, now abandoned.

BACKGROUND OF THE INVENTION

This invention relates to an apparatus such as weigher, wind-tunnel balance, pressure gauge or the like which is used for measuring a force or mass as a digital value and, particularly, to a device for compensating for a time-dependent error caused by creep of a flexural member of a force detector used in such apparatus.

For example, a load detector included in a weigher is adapted to convert deflection or strain caused by a load into an electric signal, using a lever or Roberval mechanism or such mechanism co-operating with springs (hereinunder referred to as "first type"), or a flexural member whose strain is electrically detected by a strain gauge (hereinunder referred to as "second type"). While such detectors generally produce an output signal as soon as the load is applied thereto, the signal value may vary slightly with a lapse of time to result in erroneous indication. This effect is referred to as "creep" and a technique for compensating for such creep error is disclosed, for example, in U.S. Pat. Nos. 4,412,298 and 4,691,290.

However, it is necessary to apply temperature correction to the amount of compensation in the abovementioned first type of detector in order to improve its indication accuracy, since its creep characteristic often varies with its surrounding tempearture. On the other hand, in the second type of detector such as strain gauge load cell including mechano-electric convertors attached or adhered to a flexural member, a delicate difference may appear during a lapse of time between the strains in both flexural member and convertor. As will be described in detail later, this is due to "stress relaxation". In such type of detector, therefore, it is necessary to effect overall compensation for both of the well-known creep error and the abovementioned stress relaxation error, as well as temperature correction of the amount of compensation as in the first type of detector. However, the devices of the above-cited prior art are believed to be incomplete in compensation for such time-dependent indication errors, since there is neither description nor suggestion about the abovementioned problem in the above-cited references.

Accordingly, a first object of this invention is to provide an improved compensation device which can apply temperature correction to the amount of compensation for the time-dependent indication errors due to creep of the detector.

A second object of this invention is to provide an improved compensation device which can apply correction for stress relaxation error to the amount of compensation for the time-dependent indication errors due to creep of the detector.

A third object of this invention is to provide an improved compensation device which can apply temperature correction to the amount of compensation for the time-dependent errors due to creep and stress relaxation of the detector as occasion demands.

SUMMARY OF INVENTION

According to this invention, there is provided a compensation device to be used with a measuring apparatus which delivers a detection signal from a detector as a digital discrete signal, which receives this discrete signal as its input and delivers a compensated signal as its output, and which is characterized in that it includes means for producing an essential inverse transfer function of a transfer function of the detector which exhibits a time-dependent variation in its output characteristic at the time of application of a step input, and it includes thid inverse transfer function as its own transfer function.

These and other objects and features to this invention will be described in more detail below with reference to the accompanying drawings regarding some preferred embodiments.

BRIEF DESCRIPTION OF DRAWINGS

In the drawings

Throughout the drawings, like reference numerals and symbols are given to corresponding structural components and signals.

DESCRIPTION OF PREFERRED EMBODIMENTS

Before describing the embodiments of this invention, consideration will be made first about general relationship between the creep characteristic and the structure of a weigher.

Figure 1:
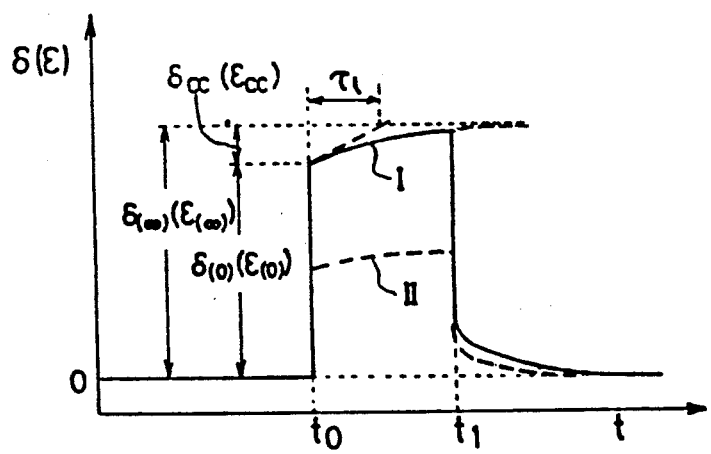
FIG. 1 is a diagram representing a time-dependent variation of deflection and strain appearing in a flexural member of a load detecting device at the time of application of a specific load to the flexural member.

There are many load or force detecting devices used in weighers, which are adapted to convert deflection or strain in a flexural member into an electric signal. As shown in FIG. 1, a flexural member immediately produces an initial deflection $\delta(0)$ in response to applied load at time point $t_0$. However, the deflection is still unstable and increases even slightly with a lapse of time as shown by curve I. The amount of variation reaches a fixed stable value $\delta(\infty)$ which is referred to as "final deflection", after a substantial length of time. Also, the deflection never returns completely to zero when the applied load is removed at time point $t_1$, thereby exhibiting a residual effect as shown. This is attributable to the creep characteristic possessed by deflection or strain of the flexural member and it is also the case as shown by curve II when the applied load is small. Now, definition will be made as follows, and $\delta_c(t)$, $\delta_{cc}$ and $\beta$ will be referred to as "creep of deflection", "final creep" and "creep coefficient", respectively.

$$\delta_c(t) = \delta(t) - \delta(0) \tag{1}$$

$$\delta_{cc} = \delta(\infty) - \delta(0) \tag{1a}$$

$$\beta = \frac{\delta_{cc}}{\delta(0)} \tag{2}$$

where $\delta(t)$ is deflection at time t after application of the load. As deflection and strain of a flexural member are mutually proportional, $\delta(t) = K\epsilon(t)$, $\delta(0) = K\epsilon(0)$ and $\delta_{cc} = K\epsilon_{cc}$, where $\epsilon(t)$, $\epsilon(0)$ and $\epsilon_{cc}$ are strains corresponding to deflections $\delta(t)$, $\delta(0)$ and $\delta_{cc}$, respectively. Accordingly, $$\frac{\epsilon_{cc}}{\epsilon(0)} = \frac{\delta_{cc}}{\delta(0)} = \beta \tag{2a}$$

Therefore, the creep characteristic relating to either strain $\epsilon$ or deflection $\delta$ has the same shape as shown in FIG. 1 in no-dimensional mode.

A model of response of a step-like input w.u(t) of a fixed load w which is applied to a flexural member and becomes stable after a substantial length of time is referred to as "Voigt model" and can be approximated by the following equation.

$$\epsilon(t) = \epsilon(\infty) + [\epsilon(0) - \epsilon(\infty)] e^{-\frac{t}{\tau_l}} \tag{3}$$

where $\tau_l$ is a time constant of creep which will be described later. Putting now:

$$\epsilon(\infty) - \epsilon(0) = \epsilon_{cc} \tag{4}$$

then, Equation 3 can be written as follows.

$$\begin{aligned} \epsilon(t) &= \epsilon(0) + \epsilon_{cc}(1 - e^{-\frac{t}{\tau_l}}) \\ &= \epsilon(0) \left[ 1 + \frac{\epsilon_{cc}}{\epsilon(0)} (1 - e^{-\frac{t}{\tau_l}}) \right] \end{aligned} \tag{3a}$$

If Equation 2a is applied thereto, then, $$\epsilon(t) = \epsilon(0)[1 + \beta(1 - e^{-\frac{t}{\tau_l}})] \tag{3b}$$

If strain is rewritten into deflection, then, $$\delta(t) = \delta(0)[1 + \beta(1 - e^{-\frac{t}{\tau_l}})] \tag{5}$$

As the material of the load detecting flexural member of a weigher, steel alloys, aluminium alloys or high-class isoelastic materials such as Co-Elinver or Ni-span C, which have high elastic proportional limits and low creep coefficients $\beta$, are preferable. The value of $\beta$ differs among the materials, while many of them are 1/500 to 1/2000 at 20° C. This value increases generally with temperature above 20° C. and tends to slightly decrease with temperature below 20° C. It can be considered as a constant when the compensation accuracy for the error due to creep need not be concerned so much.

Figure 2:
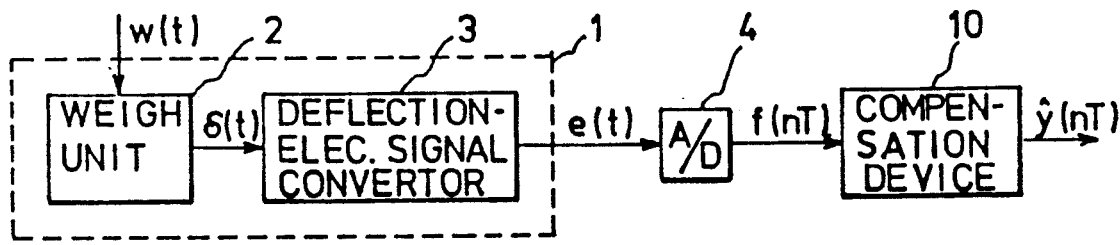
FIGS. 2 and 3 are block diagrams representing two types of weight signal transfer systems according to this invention.
Figure 3:
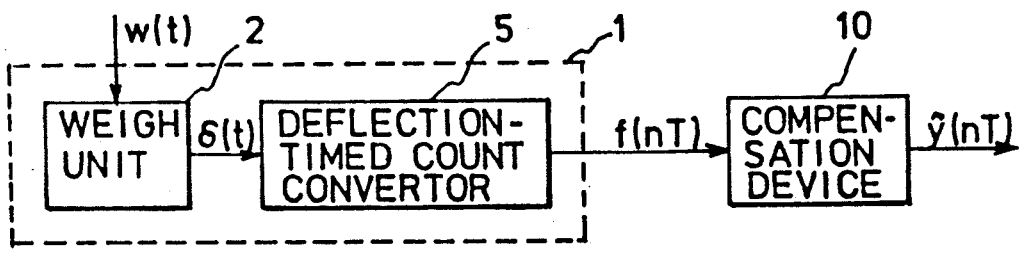

While the input weight signal of the compensation device according to this invention must be a digital discrete signal as described heretofore, the modes of connection with the weighing device can be classified into two types as follows, since the weighing device is classified into either analog or digital output type. In the first type as shown in FIG. 2, the weighing device 1 includes a weigh unit 2 and a displacement/signal convertor 3. A load w(t) applied to the weighing device 1 produces deflection $\delta(t)$ of the flexural member and the deflection is converted into an analog electric signal e(t) of voltage or current by the displacement/voltage or current convertor 3. Accordingly, the output e(t) of the weighing device 1 is converted into a digital discrete signal f(nT) by an analog-to-digital (A/D) convertor 4 and then applied to the compensation device 10 of this invention to become a compensated digital signal y(nT), where T is sampling interval and n is sampling number. In the second type as shown in FIG. 3, the weighing device 1 includes a weigh unit 2 and a displacement-/pulse rate convertor 5. In this type, pulses are generated at a frequency corresponding to deflection $\delta(t)$ of the weigh unit 2 and the number of pulses within a predetermined time is counted. This count can be a directly applied to the compensation device 10 of this invention since it forms the digital discrete signal f(nT) as the above operation is repeated at a predetermined time interval.

A first example of weighing mechanism which exhibits a creep characteristic is disclosed by Japanese patent publication No 50-33428. It belongs to the abovementioned first type and the weigh unit 2 includes a Roberval mechanism utilizing a spring as a flexural member and a differential transformer is used as the convertor 3. Those which utilize an annular or looped elastic member as the flexural member are also included in this example.

A second example is disclosed by Japanese patent publication No 59-27849 and belongs to the abovementioned second type though it uses a flexural member similar to that in the first example. The convertor 5 includes a variable frequency pulse generator having a capacitor which changes its capacitance with the deflection and a timed pulse counter, and the count of the counter forms a digital signal f(nT).

A third example is disclosed by Japanese patent publication No 59-131131 and it includes a variable frequency pulse generator utilizing such a feature of a vibrating string whose frequency varies with tension of the string and a timed pulse counter and generates a discrete digital signal f(nT) similarly to the above. This type of force detector exhibits very small creep having a creep coefficient of about 1/5000, for example.

A fourth example is of electromagnetically balanced type as disclosed by Japanese patent publication No. 60-32127. A current is supplied to a solenoid to produce an electromagnetic force for cancelling displacement due to the load and a voltage proportional to the current is derived as the analog signal e(t) of FIG. 2. This analog signal often exhibits a creep characteristic. Although an increased balancing current results in increased power consumption and raised temperature, the resultant error of the weight signal is normally temperature-compensated. However, a substantial time is needed for conducting heat from the solenoid throughout an electromagnet having a large mass to allow it to come in thermal equilibrium and the magnetic flux varies with temperature. This can be considered as a principal cause of the creep characteristic.

In any case of the abovementioned examples, the output signal f(nT) of FIG. 2 or 3 including creep is composed of discrete digital values of sampling interval T. If the itinial signal is a unit signal having a magnitude of unity, the signal f(nT) is given by the following equation.

$$f(nT) = \begin{cases} 0 & n < 0 \\ 1 + \beta(1 - e^{-\frac{nT}{\tau I}})n \geq 0 \end{cases} \quad (6)$$

Because the initial strain $\epsilon(0)$ or deflection $\delta(0)$ and the initial signal f(0) proportionally correspond in the corresponding relationship of the strain $\epsilon(t)$ or deflection $\delta(t)$ and the signal f(nT) of Equation 3b or 5 and Equation 6.

Z-transform $F_u(z)$ of the unit input u(nT) is given as follows.

$$F_u(z) = \frac{1 - [e^{-\frac{T}{\tau I}} - \beta(1 - e^{-\frac{T}{\tau I}})]z^{-1}}{(1 - z^{-1})(1 - e^{-\frac{T}{\tau I}}z^{-1})} \quad (7)$$

Assuming now that no creep occurs and a unit-step input u(nT) is applied, the input signal is given by the following equation.

$$u(nT) = \begin{cases} 0, & \text{when } n < 0 \\ 1, & \text{when } n \geq 0 \end{cases} \quad (8)$$

Z-transform U(z) of Equation 8 is as follows.

$$U(z) = \frac{1}{1 - z^{-1}} \quad (9)$$

As the transfer function $G_1(z)$ of creep is expressed by a ratio of Z-transform $F_u(z)$ of a signal including creep and Z-transform U(z) of a signal including no creep, the following equation is derived from Equations 7 and 9.

$$G_1(z) = \frac{F_u(z)}{U(z)} = \frac{1 - [e^{-\frac{T}{\tau I}} - \beta(1 - e^{-\frac{T}{\tau I}})]z^{-1}}{1 - e^{-\frac{T}{\tau I}}z^{-1}} \quad (10)$$

If a dividing operation of the numerator by the denominator of Equation 10 is realized, the following equation will be obtained.

$$G_1(z) = 1 + \beta(1 - e^{-\frac{T}{\tau I}})z^{-1} + \beta(1 - e^{-\frac{T}{\tau I}})e^{-\frac{T}{\tau I}}z^{-2} + \beta(1 - e^{-\frac{T}{\tau I}})e^{-\frac{T}{\tau I}}z^{-3} + \ldots \quad (10a)$$

Substituting now as follows, $$A = \beta(1 - e^{-\frac{T}{\tau I}}) \quad (10b)$$

$$B = e^{-\frac{T}{\tau I}} \quad (10c)$$

then, $G_1(z)$ is given by the following equation when $n > 1$.

$$\begin{aligned} G_1(z) &= 1 + Az^{-1} + ABz^{-2} + AB^2z^{-3} + \ldots + AB^{n-1}z^{-n} \\ &= \left(1 - \frac{A}{B}\right) + \frac{A}{B}(1 + Bz^{-1} + B^2z^{-2} + B^3z^{-3} + \ldots + B^nz^{-n}) \\ &= \left(1 - \frac{A}{B}\right) + \frac{A}{B} \cdot \frac{1}{(1 - Bz^{-1})} \end{aligned} \quad \begin{matrix}(10d)\\ \\ \\(10e)\end{matrix}$$

As above factor B is a ratio of the coefficients of adjoining terms of Equation 10a, namely the coefficients of $z^{-(n+1)}$ and $z^{-n}$ thereof, Equation 10c represents a time rate of change of the creep.

Equation 10 has been derived by modelling the state of loading and assuming the application of unit stop signal u(nT). When a linear relationship can be assumed between the input and the output as above-described, however, a similar relationship is established between the modelled ideal input $f_1(nT)$ including no creep and the practical input f(nT) including creep, even when a load is applied as an arbitrary function relating to time. According, the following relationship will be established if Z-transforms of the respective signals are expressed by $F_1(z)$ and $F(z)$.

$$F(z) = F_1(z) \cdot G_1(z) \quad (11)$$

Accordingly, if the transfer function $H_1(z)$ of the compensation device 10 of FIGS. 2 and 3 is assumed as an inverse transfer function of $G_1(z)$, it will be given by the following equation as a transfer function of a linear system.

$$H_1(z) = \frac{1}{G_1(z)} \quad (12)$$

$$= (1 - e^{-\frac{T}{\tau I}}z^{-1}) \cdot \frac{1}{1 - [e^{-\frac{T}{\tau I}} - \beta(1 - e^{-\frac{T}{\tau I}})]z^{-1}}$$

The system of Equation 12 is stable and a compensation circuit having a transfer function according to this equation can be realized. Expressing Z-transform of the output signal of the compensation device 10 as $Y_1(z)$, then, the following equation is obtained from Equation 11.

$$Y_1(z) = F(z) \cdot H_1(z) \approx F_1(z) \qquad (13)$$

In other words, since a signal nearly equal to the modelled ideal signal $F_1(z)$ is obtainable as the signal $Y_1(z)$, the signal $Y_1(nT)$ transformed therefrom will be a signal compenzated for freep.

The creep coefficient $\beta$ needs to be corrected for temperature when highly accurate compensation is required, since it is liable to be affected by temperature. The creep coefficient $\beta$ can be expressed by a quadratic polynomial as a function of temperature $\theta$. For example, the following equation is established if the value of $\beta$ at 20° C. is expressed as $\beta(20)$.

$$\beta(\theta) = \beta(20)[1 + C_1(\theta - 20) + C_2(\theta - 20)^2] \qquad (14)$$

In order to determine the coefficients $\beta(20)$, $C_1$ and $C_2$ in Equation 14, an output signal $f(0,\theta)$ corresponding to the initial deflection $\delta(0)$ and an output signal $f(\infty, \theta)$ corresponding to the final deflection $\delta(\infty)$ are measured at three temperature points, for example, $-10°$ C., $20°$ C., and $40°$ C. The final deflection should be measured at least two hours after loading for practical use. The measured values are applied to the following equation 2b which is derived from Equation 2a, for calculating the values $\beta(-10)$, $\beta(20)$ and $\beta(40)$.

$$\beta(\theta) = \left(\frac{\delta_{cc}}{\delta(0)}\right)_\theta = \left(\frac{\delta(\infty) - \delta(0)}{\delta(0)}\right)_\theta = \frac{f(\infty,\theta) - f(0,\theta)}{f(0,\theta)} \qquad (2b)$$

These three pairs of $\beta$ and $\theta$ values are used in Equation 14 to obtain three simultaneous equations which are then solved to obtain the values of $\beta(20)$, $C_1$ and $C_2$. The creep coefficient $\beta$ calculated from thus identified Equation 14 can be used in Equation 12 of the transfer function $H_1(z)$ of the abovementioned compensation device, while the time constant $\tau_I$ in the equation is determined as follows. As well known in the art, the time constant $\tau_I$ relates to the initial differential coefficient of the creep characteristic as shown in FIG. 1. The initial differential coefficient of the output signal $f(nT)$ including creep is directly obtained from Equation 6 as follows.

$$\left(\frac{df}{dt}\right)_{t=0} = \frac{\beta}{\tau_I} \qquad (14a)$$

Accordingly, the time constant $\tau_I$ can be determined by using the relationship of this equation to successive data of $f(nT)$ measured at normal temperature. The time constant $\tau_I$ can be determined also by utilizing a personal computer program for regression analysis. Thus, Equation 12 of the transfer function $H_1(z)$ is completely identified.

Figure 4:
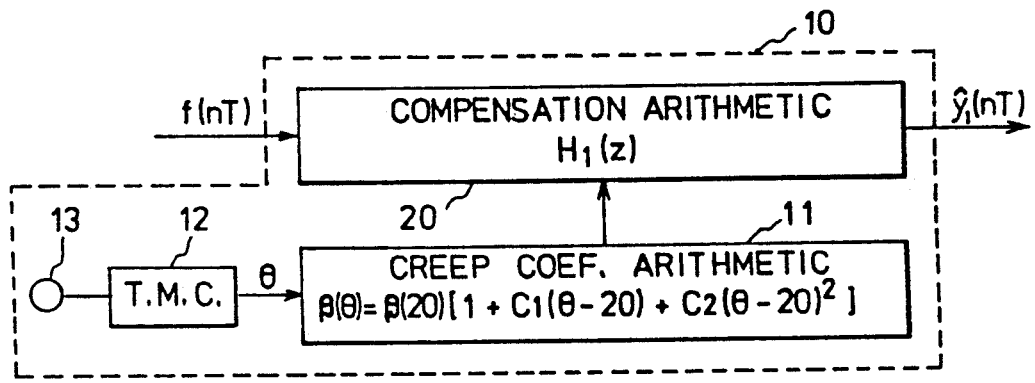
FIG. 4 is a block diagram representing a schematic configuration of the compensation device according to this invention.
Figure 5:
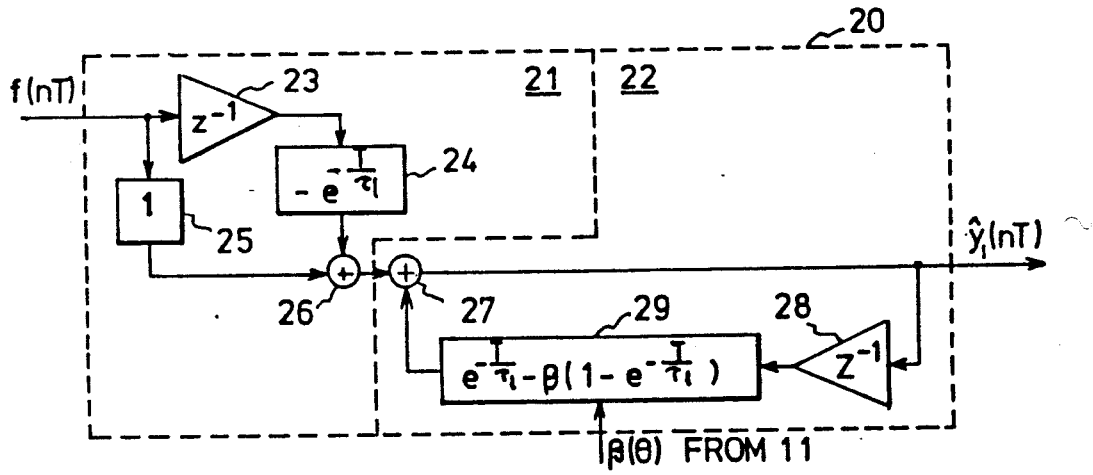
FIGS. 5 and 6 are block diagrams representing two embodiments of the compensation device according to this invention.

FIGS. 4 and 5 show an embodiment of the compensation device 10. The compensation circuit 10 includes a compensation arithmetic circuit 20 for producing an output signal $Y_1(nT)$ by weighting the input digital signal $f(nT)$ with the transer function $H_1(z)$ according to Equation 12, and a creep coefficient arithmetic circuit 11 for calculating the temperature-compensated value $\beta(\theta)$ of creep coefficient $\beta$ in Equation 12 by using Equation 14 and supplying it to the circuit 20. The circuit 11 is adpted to receive a temperature signal $\theta$ from a temperature measuring circuit 12 which is provided with a temperature detector 13 for detecting temperature in the vicinity of the flexural member of the weigh unit 2 (FIGS. 2 and 3). As described in conjunction with Equation 13, the output $Y_1(nT)$ of the circuit 20 is originally a creep-compensated weight signal, while it becomes a compensated signal independent of temperature as a result of addition of the circuit 11.

FIG. 5 shows an embodiment of the compensation arithmetic circuit 20. This circuit is constituted as a digital filter essentially including circuits of non-recursive type and recursive type and adapted to execute an arithmetic operation of the right side of Equation 12. More particularly, a portion 21 composed of a non-recursive circuit surrounded by a dashed line takes charge of the operation of the numerator (or first term) of the right side and another portion 22 composed of a recursive circuit takes charge of the operation of the denominator (or second term). The portion 21 includes a delay element 23, coefficient multipliers 24 and 25 and an adder 26 and the portion 22 includes an adder 27, a delay element 28 and a coefficient multiplier 29. The input signal $f(nT)$ is delayed by one sampling time T by the delay element 23 and then multiplied by a coefficient $-e^{-T/\tau_I}$ by the coefficient multiplier 24. The input signal $f(nT)$ is also multiplied by a coefficient of unity by the coefficient multiplier 24 and then added to the output of the coefficient multiplier 24 by the adder 26. The output of the adder 26 is connected to one input of the adder 27 which provides the output $Y_1(nT)$ of the circuit 20 or the device 10, while the output of the adder 27 is delayed by one sampling time by the delay element 28 and then multiplied by a coefficient $e^{-T/\tau_I} - \beta(1 - e^{-T/\tau_I})$ by the coefficient multiplier 29. The output of the coefficient multiplier 29 is fed back to the other input of the adder 27 to be added to the output of the adder 26. The coefficient multiplier 29 seives a function of receiving the output $\beta(\theta)$ of the creep coefficient arithmetic circuit 11 of FIG. 4 and thereby calculating the value of the abovementioned coefficient. More particularly, the the compensation arithmetic operation where the input $f(nT)$ is applied at an arbitrary time point n will be described below. The product of the input $f(nT)$ at the time point n and the coefficient of unity of the coefficient multiplier 25 and the product of the data of input $f(n-1\ T)$ at the time point $n-1$ which is directly prior to the time point n, which is stored in the delay element 23 and the coefficient $-e^{-T/\tau_I}$ of the coefficient multiplier 24 are added by the adder 26, and the resultant sum output and the product of the data of output $Y_1(n-1\ T)$ a the time point $n-1$ which is directly prior to the time point n, which is stored in the delay element 28 and the coefficient $e^{-T/\tau_I} - \beta(1 - e^{-T/\tau_I})$ of the coefficient multiplier 29 are added by the adder 27. The resultant value is delivered as the output $Y_1(nT)$ at the time point n. Such compensation atithmetic operation is repeated at every new input.

By expanding the right side of Equation 15 about z and then transforming it in accordance with Equations 10a to 10e, the following equation is obtained.

$$H_1(z) = \left(1 + \frac{A}{B_1}\right) - \frac{A}{B_1} \frac{1}{1 - B_1 z^{-1}} \qquad (12a)$$

where $$A = \beta(1 - e^{-\frac{T}{\tau l}}) \qquad (10b)$$

$$B_1 = e^{-\frac{T}{\tau l}} - \beta(1 - e^{-\frac{T}{\tau l}}) \qquad (12b)$$

Figure 6:
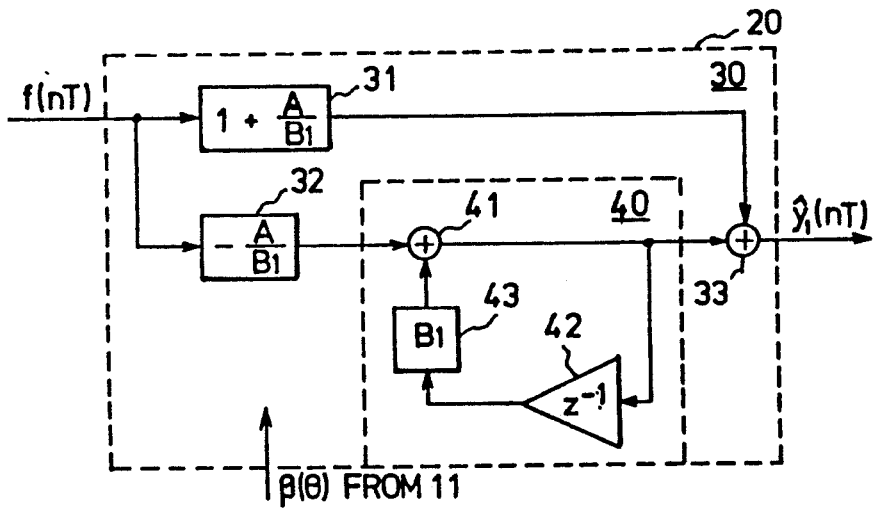

The transfer function of Equation 12a is also realizable as a stable system and FIG. 6 shows a circuit in which it is realized as another embodiment of the compensation arithmetic circuit 20. This circuit 20 also comprises a non-recursive circuit portion 30 and a recursive circuit portion 40. The portion 30 includes coefficient multipliers 31 and 32 and an adder 33 and the portion 40 includes an adder 41, a delay element 42 and a coefficient multiplier 43. The input signal f(nT) is multiplied by coefficients $1+A/B_1$ and $-A/B_1$ respectively by the coefficient multipliers 31 and 32 and then supplied respectively to the adders 33 and 41. The output of the adder 41 is delayed by one sampling time T by the delay element 42, multiplied by a coefficient $B_1$ by the coefficient multiplier 43 and then fed back to the adder 41 to be added to the output of the coefficient multiplier 32. The sum output of the adder 41 is summed with the output of the coefficient multiplier 31 by the adder 33 to produce the output $Y_1(nT)$. Since, in this circuit, the parameters A and $B_1$ include the creep coefficient $\beta$ as shown by Equations 10b and 12b, the coefficient multipliers 31, 32 and 43 respectively serve a function of receiving the output $\beta(\theta)$ of the creep coefficient arithmetic circuit 11 (FIG. 4) to calculate their own coefficents. Accordingly, the actual circuit configuration will be more complicated than the embodiment of FIG. 5. No description will be made on the operation of this circuit for avoiding complication, as it will be readily understood from the description of the operation of FIG. 5.

Figure 7:
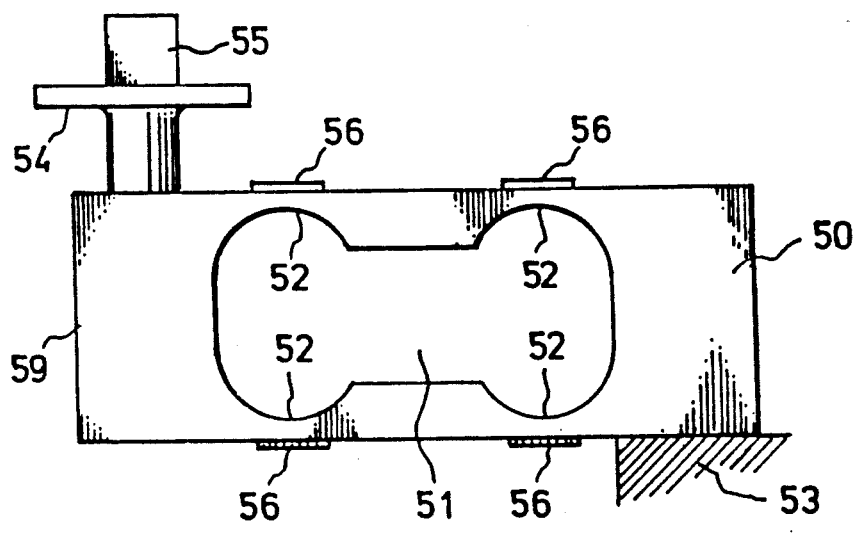
FIG. 7 is a side view representing an example of weigh unit of well-known strain gauge load cell type.
Figure 8:
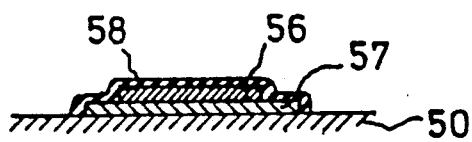
FIG. 8 is an enlarged sectional view of a state of attachment of a strain gauge in the weigh unit of FIG. 7.

FIG. 7 shows a structure of a weigh unit of so-called strain gauge load cell type. This unit includes a flexural member 50, as shown, which is a rectangular thick plate of elestic material having a uniform thickness and a substantially rectangular opening 51 whose corners are specifically machined to form flexures 52. When the flexural member 50 is fixed at one end thereof to a base 53 and a load 55 is put on a weighing platform 54 provided on the loading side block 59, the flexural member 50 delects at the flexures 52 and causes a parallelogramic deformation as shown by a Roberval mechanism to provide a displacement δ of the platform 54 corresponding to the load. In order to measure this displacement, a strain gauge 56 is attached or adhered to the surface of each flexure 52 through an insulating material 57 and an insulting coating 57 is applied thereon, as shown in detail in FIG. 8. The four strain gauges are connected in a Wheatstone bridge and the output voltage of the bridge is amplified into the analog weight signal e(t) of FIG. 2 and further converted into the digital weight signal f(nT).

While the initial value of the signal f(nT) appears immediately when the load is applied to this weighing device, the value generally shows a small amount of time-dependent variation as same as the above embodiment. However, the variation sometimes does not accord with Equation 6 and this is for the following reason. In case of using a displavement/electric signal convertor such as strain gauge attached or adhered to a fluxural member, strain $\epsilon(t)$ generating at the surface of the flexure 52 (hereinunder referred to as "strain of flexure") accords with Equation 3b but it is not equal to the strain $\epsilon_g(t)$ generating in the strain gauge since it is effected by the abovementioned insulating material 57 and insulating coating 58. This effect is referred to as "stress relaxation" therebetween. Considering now a stress relaxation system having the strains $\epsilon(t)$ and $\epsilon_g(t)$ as its input and output, respectively, its transfer function will be sought.

If the input strain $\epsilon(t)$ is given as a unit step signal u(nT), the following equation will be established.

$$u(nT) = \begin{cases} 0, & \text{when } n < 0 \\ 1, & \text{when } n \geq 0 \end{cases} \qquad (15)$$

Its Z-transform is given as follows.

$$U(z) = \frac{1}{1 - z^{-1}} \qquad (16)$$

The corresponding output signal w(nT) is given by the following equation, where $\tau_g$ is time constant of stress relaxation and $\gamma$ is stress relaxation coefficient.

$$w(nT) = \begin{cases} 0, & \text{when } n < 0 \\ 1 - \gamma(1 - e^{-\frac{nT}{\tau_g}}), & \text{when } n \geq 0 \end{cases} \qquad (17)$$

Z-transform of Equation 17 is given as follows.

$$\Omega(z) = \frac{1 - [e^{-\frac{T}{\tau_g}} + \gamma(1 - e^{-\frac{T}{\tau_g}})]z^{-1}}{(1 - z^{-1})(1 - e^{-\frac{T}{\tau_g}} z^{-1})}$$

Accordingly, the transfer function of stress relaxation $G_2(z)$ is given as follows.

$$G_2(z) = \frac{\Omega(z)}{U(z)} = \frac{1 - [e^{-\frac{T}{\tau_g}} + \gamma(1 - e^{-\frac{T}{\tau_g}})]z^{-1}}{1 - e^{-\frac{T}{\tau_g}} z^{-1}} \qquad (19)$$

The stress relaxation coefficient $\gamma$ of Equation 19 can be expressed by the following equation as a quadratic function of temperature $\theta$ with reference to 20° C. as same as the creep coefficient $\beta$ of Equation 14.

$$\gamma(\theta) = \gamma(20)[1 + C_3(\theta - 20) + C_4(\theta - 20)^2] \qquad (20)$$

Figure 9:
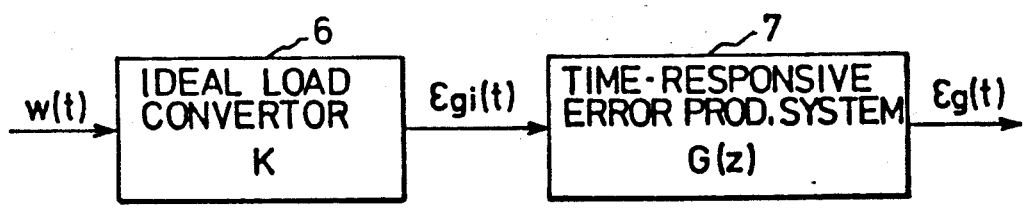
FIG. 9 is a block diagram representing a signal transfer system in the case where the inventive compensation device is applied to the weigh unit of FIG. 7.

Now, the strain gauge of load cell including time-dependent variation in its load-responsive output will be considered with an equivalent model as shown in FIG. 9. More particularly, 6 denotes an "ideal load convertor" which produces an output exhibiting a time-dependent change quite similar to the time-dependent change of the load when the load is applied thereto, and 7 denotes a "time-dependent error generating system" which is connected in series therewith and provides the output with a time-dependent error. It is now considered that the time-dependent error is produced in the output of the strain gauge by the time-dependent error generating system and, here, this time-dependent error generating system is composed of the aforementioned creep producing system and stress relaxation system. Then, the input $\epsilon_{gi}(t)$ of the time-dependent error generating system will be an ideal modelled signal (strain including no time-dependent error) and the output $\epsilon_g(t)$ thereof will be an actual signal output (strain including a time-dependent error). The transfer function G(z) of the time-dependent error generating system can be expressed as a product of the transfer function of creep $G_1(z)$ and the transfer function of stress relaxation $G_2(z)$.

$$G(z) = G_1(z)G_2(z) = \frac{1 - [e^{-\frac{T}{\tau l}} - \beta(1 - e^{-\frac{T}{\tau l}})]z^{-1}}{1 - e^{-\frac{T}{\tau l}}z^{-1}} \times \frac{1 - [e^{-\frac{T}{\tau g}} + \gamma(1 - e^{-\frac{T}{\tau g}})]z^{-1}}{1 - e^{-\frac{T}{\tau g}}z^{-1}} \quad (21)$$

The right side of the equation is expanded by effecting individual dividing operations of the first and second terms and mutually multiplying both results, and negligibly small product terms of $\beta\gamma$ are removed therefrom. Then, the following equation is obtained.

$$G(z) = 1 + [\beta(1 - e^{-T/\tau l}) - \gamma(1 - e^{-T/\tau g})]z^{-1} + \quad (21a)$$
$$[\beta(1 - e^{-T/\tau l})e^{-T/\tau l} - \gamma(1 - e^{-T/\tau g})e^{-T/\tau g}]z^{-2} +$$
$$[\beta(1 - e^{-T/\tau l})e^{-2T/\tau l} - \gamma(1 - e^{-T/\tau g})e^{-2T/\tau g}]z^{-3} +$$
$$[\beta(1 - e^{-T/\tau l})e^{-3T/\tau l} - \gamma(1 - e^{-T/\tau g})e^{-3T/\tau g}]z^{-4} + \ldots$$

Assuming now that a unit input signal u(nT) is applied to a system having this transfer function to produce an output signal $\epsilon_{gu}(nT)$ and that the Z-transform of the output signal is $E_{gu}(nT)$, then, $$E_{gu}(z) = G(z)U(z) = G(z) \cdot \frac{1}{1 - z^{-1}} \quad (22)$$

The abovementioned output signal $\epsilon_{gu}(nT)$ represents a time-dependent change of strain $\epsilon_g$ which appears in the strain gauge of the load cell when it receives a step input of unit load. When the theorem of final value of Z-transform is applied to Equation 22 and Equation 21 is applied to G(z), the following equation is obtained by removing the product terms of $\beta\gamma$.

$$\epsilon_{gu}(\infty) = [(1 - z^{-1})E_{gu}(z)]_{z=1} = [G(z)]_{z=1} \quad (23)$$
$$= (1 + \beta)(1 - \gamma) \approx 1 + \beta - \gamma$$

The equation 23 represents the output after a long time from application of the unit step load.

When the theorem of initial value of Z-transform is applied and a similar process is executed, the following equation is obtained.

$$\epsilon_{gu}(0) = 1 \quad (24)$$

This equation represents the initial output when the unit load is applied.

Equation 23 can be rewritten as follows.

$$\epsilon_{gu}(\infty) - 1 = \beta - \gamma$$

If Equations 24, 14 and 20 are applied thereto in connection with arbitrary temperature $\theta$, the following relationship will be established.

$$\frac{\epsilon_{gu}(\infty,\theta) - \epsilon_{gu}(0,\theta)}{\epsilon_{gu}(0,\theta)} = \beta(\theta) - \gamma(\theta) \quad (25)$$
$$= \beta(20) - \gamma(20) +$$
$$[\beta(20)C_1 - \gamma(20)C_3](\theta - 20) +$$
$$[\beta(20)C_2 - \gamma(20)C_4](\theta - 20)^2$$

If the equation rewritten as follows, $$\frac{\epsilon_{gu}(\infty,\theta) - \epsilon_{gu}(0,\theta)}{\epsilon_{gu}(0,\theta)} = \alpha(\theta) \quad (25a)$$

the value $\alpha(\theta)$ is a coefficient of time-dependent change of the strain of the strain gauge of a strain gauge load cell and can be expressed as follows.

$$\alpha(\theta) = \alpha(20)[1 + C_5(\theta - 20) + c_6(\theta - 20)^2] \quad (26)$$

If Equations 24, 25 and 26 are considered as polynomials about $(\theta - 20)$ and the coefficients of respective terms are compared, the following relationship will be established.

$$\gamma(20) = \beta(20) - \alpha(20) \quad (27a)$$

$$C_3 = \frac{\beta(20)C_1 - \alpha(20)C_5}{\gamma(20)} \quad (27b)$$

$$C_4 = \frac{\beta(20)C_2 - \alpha(20)C_6}{\gamma(20)} \quad (27c)$$

The values of coefficient $\gamma(20)$ and parameters $C_3$ and $C_4$ can be determined from the above equations 27a, 27b and 27c.

Next, the description will be made about a procedure of actually seaking the creep coefficient $\beta(\theta)$ of strain in a flexure of a strain gauge load cell in accordance with Equation 3b and a procedure of measuring the time-dependent change coefficient $\alpha(\theta)$ of an output signal of the load cell and calculating the stress relaxation coefficient $\gamma(\theta)$. In this case, the vertical displacement $\delta(t)$ of the loading block 59 as described in connection with FIG. 7 is measured by a precise displacement measuring apparatus (not shown), since it is difficult to directly measure the creep characteristic of the strain $\epsilon(t)$ of the flexure of the load cell. More particularly, it is considered that there is a direct connection between the strain $\epsilon(t)$ in the flexure 52 and the displacement $\delta(t)$ of the loading block 59 and the relations of Equations 3b and 5 are established. In this measurement, the sampling inverval T is suitably selected within a range of 3 to 6 seconds and the time point of measurement of the final deflection $\delta(\infty)$ is set at 2 to 3 hours after application of the load. The temperatures used for determining the temparture coefficient may be $-10°$ C., $20°$ C. and $40°$ C. as described above.

First, at a temperarure of 20° C., a unit load 55 is put quickly upon the loading block 59 of FIG. 7 and discrete data of the deflection $\delta(nT,\theta=20°$ C.) of the platform 54 and the weigh output $f(nT,\theta=20°$ C.) at the sampling numbers n=1,2,3, ... are taken for two hours. Similar measurement is then executed at temperatures of $-10°$ C. and 40° C. to take similar discrete data. $\delta(0)$ and $\delta_{cc}$ are sought respectively from the data of deflection $\delta$ at the abovementioned three temperatures and the values of $\beta(-10)$, $\beta(20)$ and $\beta(40)$ are calculated using Equation 2b. The calculated values are applied to Equation 14 to form three equations which are then solved to obtain the unknown parameters $\beta(20)$, $C_1$ and $C_2$ of Equation 14.

It can be considered that the weigh output f(nT) is proportional to the abovementioned strain $\epsilon_g(t)$ growing in the strain gauge. Accordingly, expressing the output signal at the time of application of the unit step load as $f_u(nT)$, its initial value as $f_u(0)$ and a stable value to which it converges after a long time as $f_u(\infty)$, the aforementioned $\epsilon_{gu}(nT)$, $\epsilon_{gu}(0)$ and $\epsilon_{gu}(\infty)$ correspond respectively to $f_u(nT)$, $f_u(0)$ and $f_u(\infty)$. Therefore, if it is defined that:

$$f_{ucc} = f_u(\infty) - f_u(0) \tag{28}$$

then, the time-dependent change coefficient $\alpha(\theta)$ of strain gauge load cell of Equation 25a is expressed by the following equation.

$$\alpha(\theta) = \frac{\epsilon_{gu}(\infty,\theta) - \epsilon_{gu}(0,\theta)}{\epsilon_{gu}(0,\theta)} \tag{29}$$
$$= \frac{f_u(\infty,\theta) - f_u(0,\theta)}{f_u(0,\theta)} = \frac{f_{ucc}(\theta)}{f_u(0,\theta)}$$

The coefficient $\alpha(\theta)$ at the abovementioned three temperatures can be calculated by applying the measured values of the weigh signal at these temperatures to Equation 29. Accordingly, the unknown parameters $\alpha(20)$, $C_5$ and $C_6$ of Equation 26 can be calculated by a procedure similar to the aforementioned procedure of calculating the creep coefficient $\beta(\theta)$. Moreover, the values of $\gamma(20)$, $C_3$ and $C_4$ are obtained by applying the resultant values of $\beta(20)$, $C_1$, $C_2$, $\alpha(20)$, $C_5$ and $C_6$ to Equations 27a, 27b and 27c.

Next, the time constants $\tau_g$ and $\tau_l$ will be determined. If the numerator of the right side of Equation 19 is divided by its denominator, the following equation will be obtained.

$$G_2(z) = 1 - \gamma(1 - e^{-T/\tau_g})z^{-1} - \tag{19a}$$
$$\gamma(1 - e^{-T/\tau_g})e^{-T/\tau_g}z^{-2} - \gamma(1 - e^{-T/\tau_g})e^{-2T/\tau_g}z^{-3} - \ldots$$

On the other hand, the following equation is established from the relations of Equations 10a, 19a and 21a.

$$G_2(z) = G(z) - G_1(z) + 1 \tag{30}$$

Consider now that a unit step input u(t) is applied in Equation 30. The Z-transform of u(t) is given as follows.

$$U(z) = \frac{1}{1 - z^{-1}} \tag{16}$$

Therefore,

-continued
$$\frac{1}{1 - z^{-1}} G_2(z) = \frac{1}{1 - z^{-1}} [G(z) - \{G_1(z) - 1\}] \tag{31}$$
$$= \frac{1}{1 - z^{-1}} G(z) -$$
$$\left[ \frac{1}{1 - z^{-1}} G_1(z) - \frac{1}{1 - z^{-1}} \right]$$

From Equations 19, 22 and 10, the following three equations can be derived.

$$\frac{1}{1 - z^{-1}} G_2(z) = \Omega(z) \tag{32}$$

$$\frac{1}{1 - z^{-1}} G(z) = E_{gu}(z)$$

$$\frac{1}{1 - z^{-1}} G_1(z) - \frac{1}{1 - z^{-1}} = F_u(z) - U(z) = E_r(z)$$

If the above equations are applied to Equation 31, the following equation will be obtained.

$$\Omega(z) = E_{gu}(z) = E_r(z) \tag{33}$$

Figure 10:
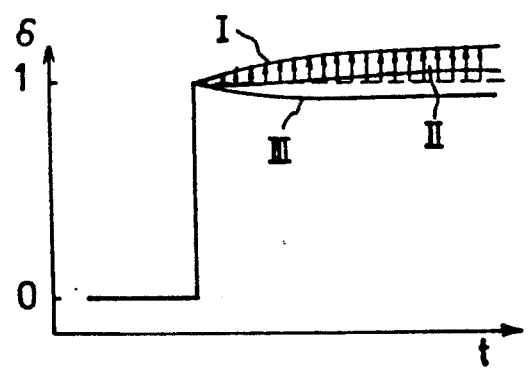
FIG. 10 is a diagram illustrating an effect of creep and stress relaxation acting to time-dependent variation of deflection.

As described already in connection with Equation 7, $F_u(z)$ in Equation 32 is Z-transform of an output signal indicative of the strain of a flexure of load cell subjected to a unit step load, which includes a time-dependent change due to creep only. In order to seek this function, the certical displacement $\delta(t)$ of the loading block 59 of FIG. 7 is measured by an ultra-fine displacement detector because of no influence from stress relaxation on the strain gauge. The displacement $\delta(t)$ is shown by Curve I in FIG. 10 if it is converted into no-dimensional mode by assuming the initial displacement $\delta(0)$ in Equation 5 as unity. U(z) in Equation 32 is Z-transform of the step input, which is shown by a horizontal dashed line in FIG. 10. Accordingly, $E_r(z)$ in Equation 32 is a function representative of the error due to creep as shown by arrows in FIG. 10, which is referred to as creep error function. $E_{gu}(z)$ in Equation 33 is Z-transform of the weigh output $f_u(nT)$ of the strain gauge 56 of FIG. 8, which includes an error due to both creep and stress relaxation. The weigh output $f_u(nT)$ is proportional to the strain $\epsilon_{gu}(nT)$ of the strain gauge. Therefore, if it is converted into no-dimensional mode by assuming its initial value. $f_u(0)$ as unity, the function $E_{gu}(z)$ can be shown by Curve II in FIG. 10 by measuring the weigh output $f_u(nT)$. Accordingly, the function $\Omega(z)$ in Equation 33, which gives the error due to stress relaxation only, is shown by Curve III obtained by subtracting the arrowed portion from Curve II.

While the above description has been made theoretically on the process of seeking the stress relaxation function $\Omega(z)$ at the time of application of step input to a strain gauge load cell, it is necessary to pay attention to each measurement for reducing all measurement errors in order to actually obtain accurate values of respective parameters. As an example, in case of sampling the deflection $\delta(nT)$ or load cell output f(nT) as discrete data corresponding to the sampling numbers n=1,2,3, ... at five second intervals, its raw data are taken at one second intervals and every five data around each sampling point are averaged to make the average the value at the sampling point. As another example, plural measurements are effected and averaged to use the average as a measured value. In this case, it is necessary to start each measurement after confirming complete distinction of the creep effect caused by the preceding measurement.

Figure 11:
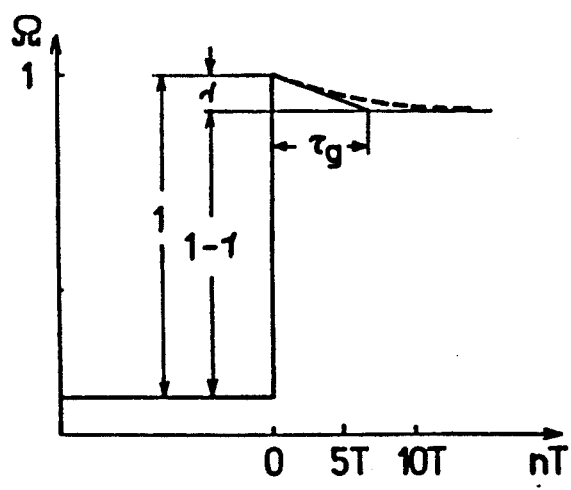
FIG. 11 is a diagram illustrating a transfer function of stress relaxation.

The dashed curve of FIG. 11 represents a stress relaxation function under step input which is drafted by connecting discrete values of $\Omega(z)$ calculated from measured values of $\delta(nT)$ or $f(nT)$ obtained as above. As shown, this function stands up from zero to unity when $nT=0$ and it deceases thereafter and endlessly approaches a value $1-\gamma$, $\gamma$ being the stress relaxation coefficient calculated by Equation 27a. The following relation exists in the stress relaxation characteristic between the time constant $\tau_g$ and the initial differential coefficeint as in the case of creep characteristic.

$$\left(\frac{df}{dt}\right)_{t=0} = \frac{-\gamma}{\tau_g} \tag{34}$$

The value of $\tau_g$ can be determined as shown in FIG. 11 by utilizing this relation. A more accurate estimate value of $\tau_g$ can be obtained by using a program software for regressive analysis of a computer.

The time constant for creep $\tau_l$ in this case in determined by processing the measured values of deflection $\delta(nT)$ at 20° C. in accordance with the procedure as described above in connection with Equation 14a. In a conventional load cell, $\tau_g$ is generally less than $\tau_l$.

Thus, all the unknown parameters included in Equation 21 of the transfer function of time-dependent characteristic of the output of strain gauge load cell have been determined and the transfer function has now been identified.

The transfer function H(z) of the compensation circuit 10 (FIG. 2) for compensating for the abovementioned time-dependent change of output is given as an inverse transfer function of G(z) of Equation 21.

$$H(z) = \frac{1}{G(z)} = \frac{1 - e^{-\frac{T}{\tau_l}}z^{-1}}{1 - [e^{-\frac{T}{\tau_l}} - \beta(1 - e^{-\frac{T}{\tau_l}})]z^{-1}} \times \frac{1 - e^{-\frac{T}{\tau_g}}z^{-1}}{1 - [e^{-\frac{T}{\tau_g}} + \gamma(1 - e^{-\frac{T}{\tau_g}})]z^{-1}} \tag{35}$$

where $\beta$ and $\gamma$ are given by the following equations as functions of temperature as described previously.

$$\beta(\theta)=\beta(20)[1+C_1(\theta-20)+C_2(\theta-20)^2] \tag{14}$$

$$\gamma(\theta)=\gamma(20)[1+C_3(\theta-20)+C_4(\theta-20)^2] \tag{20}$$

Figure 12:
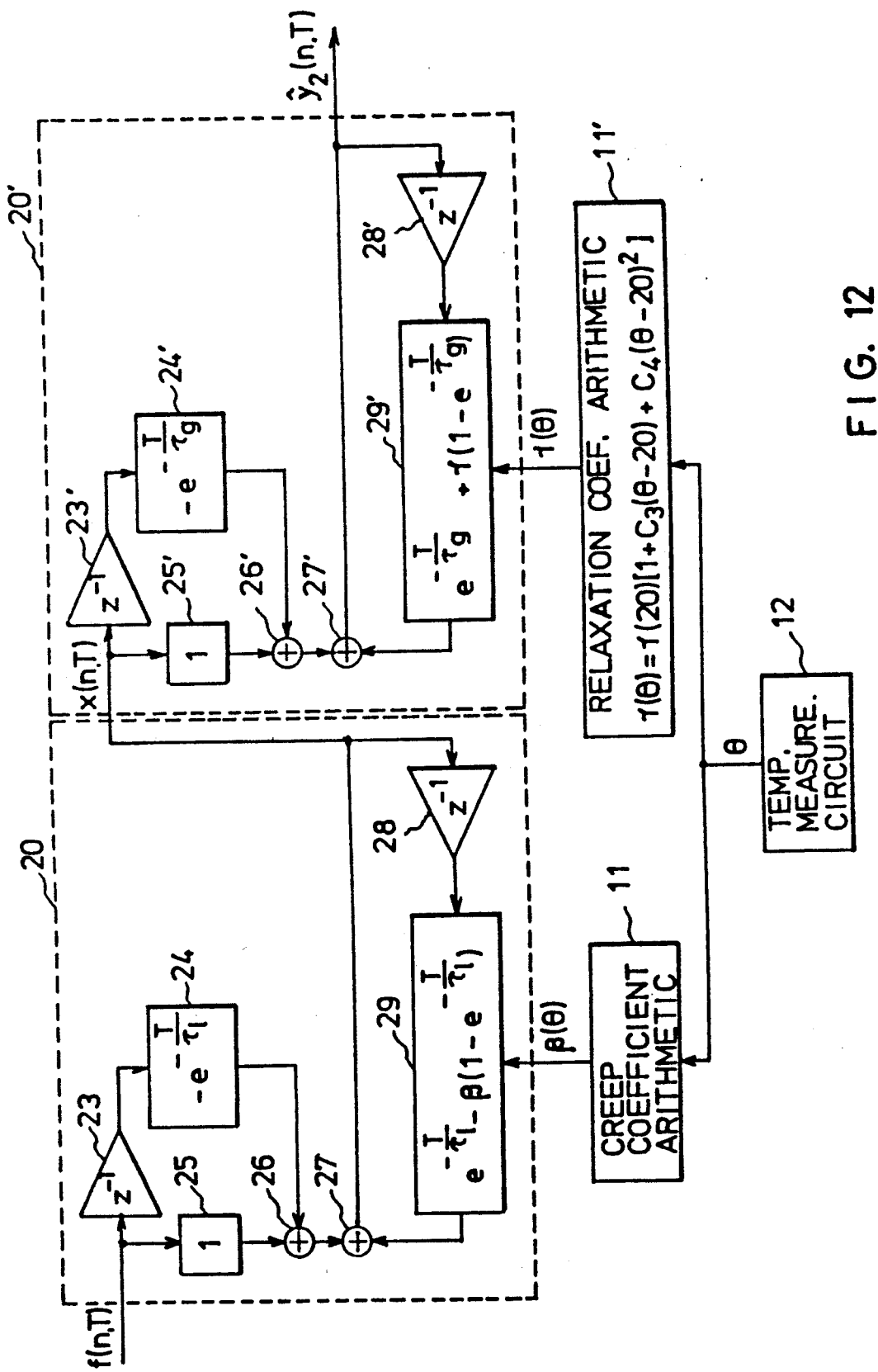
FIGS. 12 and 13 are block diagrams representing two embodiments of the compensation device according to this invention which are applicable to the weigh unit of FIG. 7.

If the first and second terms of the right side of Equation 35 are expressed by the first and second transfer functions $H_1(z)$ and $H_2(z)$, respectively, the systems having these transfer functions of the first order can be realized respectively as stable systems. Accordingly, this compensation circuit having transfer function H(z) can be realized and FIG. 12 shows an embodiment thereof. As shown, this circuit is composed of two serially connected circuit portions 20 and 20' each having non-recursive and recurcive circuits. While the first preceding circuit portion 20 is same as the circuit of FIG. 5, the second circuit portion 20' differs therefrom in that the coefficient of the multiplier 24' is $-e^{-T/\tau_g}$ and the coefficient of the multiplier 29' is $e^{-T/\tau_g}$ $+(1-e^{-T/\tau_g})$. The first circuit portion 20 executes the same operation as abovementioned in connection with FIG. 5 to produce an output x(nT) every time the input f(nT) is applied at any time point "n", and the second circuit portion 20' receives the output x(nT) and again executes the same operation as that of FIG. 5 to produce a compensated signal $Y_2(nT)$. While the creep coefficient $\beta(\theta)$ is supplied to the coefficient multiplier 29 of the first circuit portion 20 from the creep coefficient arithmetic circuit 11 (FIG. 4) as in the case of FIG. 5, the stress relaxation coefficient $\gamma(\theta)$ is supplied to the coefficient multiplier 29' of the second circuit portion 20' from a stress relaxation coefficient arithmetic circuit 11'. The circuit 11' is adapted to receive the temperature signal $\theta$ from the temperature measuring circuit 12 as same as the circuit 11 and calculate the stress relaxation coefficient $\gamma(\theta)$ at temperature $\theta$ in accordance with Equation 20.

If the numerator and the denominator of Equation 35 are expanded about $z^{-1}$, the following equation will be obtained.

$$H(z) = [1 - (e^{-\frac{T}{\tau_l}} + e^{-\frac{T}{\tau_g}})z^{-1} + e^{-\frac{T}{\tau_l}}e^{-\frac{T}{\tau_g}}z^{-2}]/ \tag{35a}$$

$$[1 - \{e^{-\frac{T}{\tau_l}} - \beta(1 - e^{-\frac{T}{\tau_l}}) + e^{-\frac{T}{\tau_g}} + \gamma(1 - e^{-\frac{T}{\tau_g}})\}z^{-1} +$$

$$\{e^{-\frac{T}{\tau_l}} - \beta(1 - e^{-\frac{T}{\tau_l}})\}\{e^{-\frac{T}{\tau_g}} + \gamma(1 - e^{-\frac{T}{\tau_g}})\}z^{-2}]$$

Figure 13:
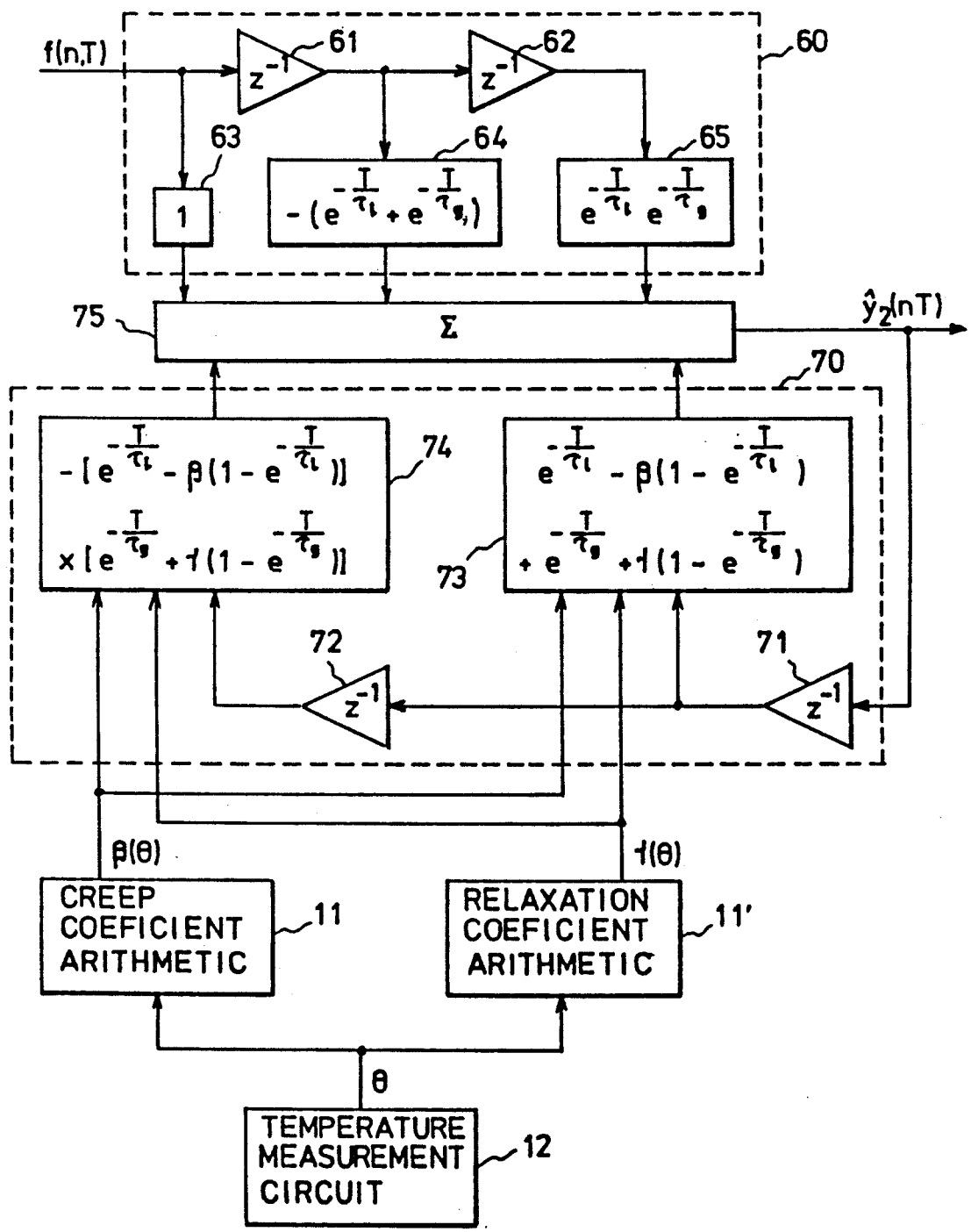

The numerator and denominator of this equation are both quadratic polynomials about $z^{-1}$ and a quadratic system having this transfer function can be realized also as a stable system. An embodiment of the compensation circuit 10 according thereto is shown in FIG. 13. As shown, this compensation circuit includes a non-recursive circuit portion 60 for arithmetically operating the numerator of Equation 35a and a recursive circuit portion 70 for arithmetically operating the denominator thereof. The non-recursive circuit portion 60 includes a circuit for producing a delay up to second order by delay elements 61 and 62 each providing a delay of one sampling time T and coefficient multipliers 63, 64 and 65 having respective coefficients indicated in their blocks. The recursive circuit portion 70 includes a circuit for producing a delay up to second order by similar delay elements 71 and 72 and coefficient multipliers 73 and 74. The outputs of these multipliers are summed by an adder 75 to provide a compensated output $Y_2(nT)$. The procedure of arithmetically operating the transfer function of Equation 35a by this circuit will not be described further since it can be easily realized by those skilled in the art. The circuit of FIG. 13 is characterized in that it includes a recursive circuit and this recursive circuit includes at least a quadratic delay element.

In the above embodiment, namely, in the case where a load is applied to a weigh unit of strain gauge load cell type as an arbitrary function about time, the following relation exists between Z-transform $F_1(z)$ of the modelled ideal input signal $f_1(nT)$ including no creep and stress relaxation and Z-transform F(z) of the actual input signal f(nT) including both creep and stress relaxation.

$$F(z)=F_1(z)\cdot G(z) \tag{36}$$

where G(z) is the transfer function of the time-dependent error generating system as shown by Equation 21 or 21a. The compensation device 10 includes therein a circuit for producing the inverse transfer function H(z) of G(z) (Equation 35 or 35a) and receives the input signal f(nT) to produce the output signal $Y_2(nT)$. The following relation exists between Z-transforms F(z) and $Y_2(z)$ of the input and output signals.

$$Y_2(z) = F(z) \cdot H(z) = F(z) \cdot \frac{1}{G(z)} \approx F_1(z) \quad (37)$$

That is to say, Z-transform of the output signal $Y_2(nT)$ is nearly equal to Z-transform of the modelled ideal input signal $f_1(nT)$. Either of the abovementioned compensation circuit of FIG. 12 or 13 is adapted so that its transfer function H(z) realizes this equation, and this means that the output of the compensation device is nearly equal to the modelled ideal input including no time-dependent change or that the output of the compensation device is compensated for both creep and stress relaxation regardless of temperature.

The above description of the preferred embodiments have been presented only for the purpose of illustrating this invention and never means any limitation of the invention. It should be readily understood by those skilled in the art that various modifications and changes can be made on these embodiments without leaving the spirit and scope of the invention as defined in the appended claims. For example, the invention can be applied as it is to a wind-tunnel balance which uses a flexural member and electrical convertors for measuring a force. Moreover, it is also applicable to essential pressure measuring equipments including pressure gauges, barometers and altimeters having such a structure as disclosed by U.S. Pat. No. 3,195,335 and even to differential pressure gauges having such a structure as disclosed by U.S. Pat. No. 3,363,456 in conjunction with the time-dependent change characteristic of their outputs when a predetermined pressure or diffential pressure is applied to their pressure sensing elements by suitable means.

We claim:

1. A compensation device for use with a measuring device having a detector for producing a discrete measurement signal indicating a characteristic of a load such as the weight of the load, said measuring device having a display for indicating the characteristic of the load measured by the detector, said detector producing said discrete measurement signal representative of the load applied to said detector, said discrete measurement signal including an error exhibiting a time-dependent change corresponding to the load, said compensation device comprising:
    means for producing an essential inverse transfer function corresponding to a transfer function of the detector signal including said time-dependent error signal;
    means, responsive to the means for producing, for modifying said discrete measurement signal produced by the detector in accordance with the essential inverse transfer function to cancel said error of said measurement signal and produce a compensated measurement signal; and
    means for indicating on the display the characteristic of the load as a function of the compensated measurement signal.

2. A device as set forth in claim 1 wherein said transfer function corresponds to one or more recursive circuits including a linear delay element.

3. A device as set forth in claim 2 wherein said transfer function producing means includes means for producing one or more coefficient multipliers, and further comprising means for changing coefficients of one or more of said coefficient multipliers in accordance with a sensed temperature.

4. A device as set forth in claim 1 wherein said transfer function producing means includes means for producing one or more coefficient multipliers, and further comprising means for changing coefficients of one or more of said coefficient multipliers in accordance with a sensed temperature.

5. A device as set forth in claim 1 wherein said transfer function producing means includes one or more coefficient multipliers, and further comprising means for changing coefficients of one or more of said coefficient multipliers in accordance with a factor which is essentially a function of a sensed temperature.

6. A device as set forth in claim 5 further comprising means for calculating said factor as a function expressed by a polynomial of one or more number of degrees.

7. A device as set forth in claim 1 wherein said transfer function $H_1(z)$ corresponds to the following equation:

$$H_1(z) = \frac{1 - e^{-\frac{T}{\tau_l}}z^{-1}}{1 - [e^{-\frac{T}{\tau_l}} - \beta(1 - e^{-\frac{T}{\tau_l}})]z^{-1}}$$

where $z^{-1}$ is one unit delay of said discrete signal, T is one interval time of said discrete signal, $\tau_l$ is a time constant included in said time-dependent change characteristic, and $\beta$ is a factor which gives one constant in a certain temperature condition.

8. A device as set forth in claim 1 wherein said transfer function H(z) corresponds to the following equation:

$$H(z) = \frac{(1 - e^{-\frac{T}{\tau_l}}z^{-1})(1 - e^{-\frac{T}{\tau_g}}z^{-1})}{[1 - \{e^{-\frac{T}{\tau_l}} - \beta(1 - e^{-\frac{T}{\tau_l}})\}z^{-1}][1 - \{e^{-\frac{T}{\tau_g}} + \gamma(1 - e^{-\frac{T}{\tau_g}})\}z^{-1}]}$$

where $z^{-1}$ is one unit delay of said discrete signal, T is one interval time of said discrete signal, $\tau_l$ and $\tau_g$ are first and second time constants, respectively, included in said time-dependent change characteristic, and $\beta$ and $\gamma$ are factors which give first and second constants, respectively, in a certain temperature condition.

9. The device as set forth in claim 1 wherein said time-dependent change characteristic of the measurement signal includes a creep characteristic and a stress relaxation characteristic, and said transfer function corresponds to an inverse transfer function of the transfer function of said creep characteristic and stress relaxation characteristic.

10. A device as set forth in claim 1 wherein said transfer function producing means corresponds to one or more recursive circuits including a multiordered delay element.

11. A device as set forth in claim 10 wherein said transfer function producing means includes means for producing one or more coefficient multipliers, and further comprising means for changing coefficients of one or more of said coefficient multipliers in accordance with a sensed temperature.

12. A method of compensation for use with measuring equipment which includes a detector for producing a measurement signal indicating a characteristic of a load such as the weight of the load, said measuring equipment having a display for indicating the characteristic of the load measured by the detector, said detector delivering said measurement signal as a discrete measurement signal which exhibits a time dependent-change in said measurement signal when a step-like input is applied to said detector, said method canceling a change of said output due to said time-dependent change, said method comprising the steps of:

measuring at least one time-dependent value of said time-dependent change characteristic, determining a transfer function regarding the time-dependent change characteristic of said measurement signal of said detector and a plurality of factors constituting said transfer function, selecting an essential inverse transfer function of said determined transfer function, modifying said discrete measurement signal in accordance with the essential inverse transfer function to produce a compensated measurement signal; and indicating on the display the characteristic of the load as a function of the compensated measurement signal.

13. A measuring device comprising:

a detector for producing a discrete measurement signal indicating a characteristic of a load such as the weight of the load, said detector producing said discrete measurement signal representative of the load applied to said detector, said discrete measurement signal including an error exhibiting a time-dependent change corresponding to the load;

a display for indicating the characteristic of the load measured by the detector;

means for producing an essential inverse transfer function corresponding to a transfer function of the detector signal including said time-dependent error signal;

means, responsive to the means for producing, for modifying said discrete measurement signal produced by the detector in accordance with the essential inverse transfer function to cancel said error of said measurement signal and produce a compensated measurement signal; and means for indicating on the display the characteristic of the load as a function of the modified discrete measurement signal.

14. An error compensation device for a measuring equipment including a detector for measuring a load to provide a measurement signal indicative of a magnitude of the load and including a display for indicating the magnitude of the load, said detector having a transfer function which includes at least one weighting factor including at least one parameter relating to surrounding temperature, and said measurement signal thereby including an error having a time-dependent change characteristic and relating to the surrounding temperature; said device comprising:

means for converting said measurement signal produced by said detector into a discrete signal;

first arithmetic means including digital circuits of non-recursive and recursive types for receiving the discrete signal of said converting means to apply thereto an arithmetic operation of an inverse of said transfer function to produce a compensated measurement signal;

second arithmetic means including a temperature sensor for sensing the surrounding temperature to provide a temperature signal, for calculating said weighting factor based upon said temperature signal and for supplying said weighting factor to said first arithmetic means; and means for indicating on the display the magnitude of the load as a function of the compensated measurement signal.

15. A device as set forth in claim 14, wherein said parameter is at least one of a creep coefficient and a stress relaxation coefficient.

16. A device as set forth in claim 14, wherein said transfer function $H_1(z)$ is given by an equation:

$$H_1(z) = \frac{1 - e^{\frac{T}{\tau_l}} z^{-1}}{1 - [e^{\frac{T}{\tau_l}} - \beta(1 - e^{\frac{T}{\tau_l}})]z^{-1}}$$

wherein $z^{-1}$ is one unit delay of said discrete signal, T is one interval time of said discrete signal, $\tau_l$ is a time constant of said time-dependent change characteristic, and $\beta$ is said parameter.

17. A device as set forth in claim 14, wherein said transfer function H(z) is given by an equation:

$$H(z) = \frac{(1 - e^{\frac{T}{\tau_l}} z^{-1})(1 - e^{\frac{T}{\tau_g}} z^{-1})}{[1 - \{e^{\frac{T}{\tau_l}} - \beta(1 - e^{\frac{T}{\tau_l}})\}z^{-1}][1 - \{e^{\frac{T}{\tau_g}} + \gamma(1 - e^{\frac{T}{\tau_g}})\}z^{-1}]}$$

wherein $z^{-1}$ is one unit delay of said discrete signal, T is one interval time of said discrete signal, $\tau_l$ and $\tau_g$ are first and second time constants of said time-dependent change characteristic, and $\beta$ and $\gamma$ are said parameter.

* * * * *